(12) United States Patent
Finlay et al.

(10) Patent No.: US 10,850,648 B2
(45) Date of Patent: Dec. 1, 2020

(54) SEAT PAN ARTICULATION MECHANISM

(71) Applicant: B/E Aerospace, Inc., Winston-Salem, NC (US)

(72) Inventors: Travis K. Finlay, Winston-Salem, NC (US); Brian P. Wenger, Kernersville, NC (US); James Stephen Kash, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/364,935

(22) Filed: Mar. 26, 2019

(65) Prior Publication Data

US 2020/0307419 A1    Oct. 1, 2020

(51) Int. Cl.
| | |
|---|---|
| *B60N 2/12* | (2006.01) |
| *B60N 2/20* | (2006.01) |
| *B60N 2/22* | (2006.01) |
| *B60N 2/68* | (2006.01) |
| *B60N 2/02* | (2006.01) |

(52) U.S. Cl.
CPC ......... *B60N 2/2209* (2013.01); *B60N 2/0284* (2013.01); *B60N 2/682* (2013.01)

(58) Field of Classification Search
CPC ..... B60N 2/2209; B60N 2/0284; B60N 2/682
USPC .......... 297/254.1, 354.1–377, 452.18, 452.2, 297/341, 342, 383
See application file for complete search history.

(56) References Cited

U.S. PATENT DOCUMENTS

| | | | | |
|---|---|---|---|---|
| 1,860,089 | A | * | 5/1932 | Ferris ..................... A47C 7/402 297/363 |
| 2,833,336 | A | | 5/1958 | Mcgregor |
| 3,711,153 | A | * | 1/1973 | Cunningham ......... B60N 2/045 297/378.1 X |
| 4,131,316 | A | * | 12/1978 | Pallant ..................... B60N 2/12 297/341 |
| 4,394,047 | A | | 7/1983 | Brunelle |
| 5,421,640 | A | * | 6/1995 | Bauer .................. B60N 2/0284 297/383 X |
| 6,139,104 | A | | 10/2000 | Brewer |
| 6,742,840 | B2 | | 6/2004 | Bentley |
| 9,284,055 | B2 | | 3/2016 | Beroth et al. |

FOREIGN PATENT DOCUMENTS

| | | | | |
|---|---|---|---|---|
| DE | | 3714954 A1 * | 11/1987 | ............. B60N 2/203 |
| DE | | 4301811 A1 * | 7/1994 | ........... B60N 2/0284 |

* cited by examiner

*Primary Examiner* — Rodney B White
(74) *Attorney, Agent, or Firm* — Suiter Swantz pc llo (57) ABSTRACT

An articulation mechanism for coupling a pivoting backrest to a traveling seat pan frame includes a first link having a first end section attachable to a pivoting backrest, and a second end section connected to the first end section, the second end section having multiple holes. A second link has a first end section and a second end section connected together, the first end section of the second link having at least one hole aligned with one of the multiple holes of the second section of the first link, the second end section of the second link is pivotally attachable to a seat pan frame. A fastener pivotally attaches the second link to the first link via the at least one hole of the second link and the selected aligned one of the multiple holes of the second end section of the first link based on a hole combination chosen to achieve a predetermined ratio of backrest recline to seat pan travel.

18 Claims, 6 Drawing Sheets

SEAT PAN ARTICULATION MECHANISM

BACKGROUND

A passenger seat assembly, such as those used in aircraft, typically has a moveable seat pan that articulates as a passenger adjusts a reclining backrest. Preferably, the articulation of the seat pan corresponds to movement of the backrest in a relationship that avoids sliding and binding sensations from the perspective of the passenger throughout various adjusting movements of a seat assembly. A seat pan typically articulates forward as a backrest reclines to a resting position and returns rearward as the backrest is returned to a more upright position. The seat pan may also tilt and/or adjust vertically.

The range of use of a reclining seat assembly may be limited by airlines or regulators for safety or space efficiency purposes. Seat assemblies may be designed with a maximum backrest recline angle that is beyond a limit set according to use in a seating row. In some cases, limits are set well below the reclining ability of a seat assembly. In a seat assembly in which the relationship between backrest movement and seat pan articulation is fixed, limiting the angle by which a backrest can be reclined results in corresponding reduced seat pan articulation, and a reduction of the effectiveness of comfort features of the seat assembly.

In some existing seat assemblies, seat pan articulation is linked to backrest adjustment in a relationship that is fixed by a linking mechanism with no effective variability. In such conventional seat assemblies, the articulation relationship could likely only be changed to suit needs that may vary by airline preferences by use of replacement parts or custom parts tailored to each application.

Accordingly, an improved seat pan articulation that permits the relationship between backrest adjustment and seat pan articulation to be varied conveniently with a set of universal or widely applicable parts is needed.

SUMMARY OF THE INVENTIVE ASPECTS

To achieve the foregoing and other advantages, the inventive aspects disclosed herein are directed to an articulation mechanism for coupling a pivoting backrest to a seat pan frame. The mechanism includes a first link or quadrant link having a first end section configured to attach to a pivoting backrest, and a second end section connected to or continuous with the first end section, the second end section having multiple holes. A second link has a first end section and a second end section connected together or continuous, the first end section of the second link having at least one hole to be aligned with one of the multiple holes of the second section of the first link, the second end section of the second link configured to pivotally attach to a seat pan frame. A fastener pivotally attaches the second link to the first link via the at least one hole of the second link and the aligned one of the multiple holes of the second end section of the first link.

In some embodiments, the multiple holes of the second end section of the first link are spaced with increasing distance from the first end section of the first link.

In some embodiments, when the first end section of the first link is attached to a pivoting backrest, and the second end section of the second link is pivotally attached to a seat pan frame, each of the multiple holes, when the first and second links are pivotally attached, corresponds to a predetermined ratio of backrest recline to seat pan travel.

In some embodiments, the second end section of the first link is linear.

In some embodiments, the first link includes a linear middle section by which the second end section of the first link is connected to the first end section of the first link; and the second end section of the first link is connected to the middle section of the first link by a bend junction.

In some embodiments, the at least one hole of the first end section of the second link is one of multiple holes in the first end section of the second link.

In some embodiments, the multiple holes in the first end section of the second link are spaced with increasing distance from a terminus of the first end section of the second link.

In some embodiments, the first end section of the second link is linear.

In some embodiments, the second link includes a linear middle section by which the second end section of the second link is connected to the first end section of the second link; and the second end section of the second link is connected to the middle section of the second link by a bend junction.

In some embodiments, the second end section of the second link has a ring surrounding a hole for pivotally attaching the second link to a seat pan frame.

In some embodiments, the second end section of the second link has a ring surrounding a hole for pivotally attaching the second link to a seat pan frame, the ring lying in a plane that is parallel to and offset from a plane in which the first end second of the second link extends.

In another aspect, the inventive concepts disclosed herein are directed to a passenger seat assembly, including at least one frame element, a backrest pivotally attached to the frame element, a seat pan frame movable relative to the frame element, and an articulation mechanism coupling the seat pan frame to the backrest. The articulation mechanism includes a first link having a first end section fixedly attached to the backrest, and a second end section connected to the first end section, the second end section having multiple holes. A second link is pivotally attached to the seat pan frame and pivotally attachable to the first link by way of any one of the multiple holes. Each of the multiple holes, when the first and second links are pivotally attached, corresponds to a predetermined ratio of backrest recline to seat pan travel.

In some embodiments, the second end section of the first link is linear, the first link includes a linear middle section by which the second end section is connected to the first end section, and the second end section is connected to the middle section by a bend junction.

In some embodiments, the second link has a plurality of holes for pivotally attaching the second link to the first link.

In some embodiments, the second link has a linear section along which the plurality of holes are spaced.

In some embodiments, the plurality of holes are spaced along the linear section of the second link with increasing distance from a terminus of the second link.

In some embodiments, wherein the second link has a ring surrounding a hole for pivotally attaching the second link to a seat pan frame.

In some embodiments, the second link has a first end section by which the second link is pivotally attachable to the first link, and the ring is disposed in a plane that is parallel to and offset from a plane in the first end section of the second link extends.

In yet another aspect, the inventive concepts disclosed herein are directed to an articulation mechanism for coupling a pivoting backrest to a seat pan frame. The mechanism includes a first link having a first end section configured to attach to a pivoting backrest, and a second end section connected to the first end section, the second end section having at least one hole. A second link has a first end section having multiple holes and a second end section configured to pivotally attach to a seat pan frame. The at least one hole of the first link can align with any one of the multiple holes of the second link to pivotally attach the second link to the first link. Each particular one of the multiple holes of the second link corresponds to a particular predetermined ratio of backrest recline to seat pan frame travel.

In some embodiments, the multiple holes of the second link are spaced with increasing distance from a terminus of the second link.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

These descriptions detail an articulation adjustment mechanism that facilitates seat pan articulation to be varied relative to backrest movement in a reclining seat. One such mechanism can be installed at each lateral side of an articulating passenger seat, for example, symmetrically. The mechanism generally includes two links, which are referenced in the following as a first link or quadrant link, and as a second link or drive link. The quadrant link is rigidly attached to the backrest frame, which rotates around its own pivot axis. Thus, the quadrant link pivots with the backrest frame and generally functions as a lever. The drive link is pivotally attached to the seat pan frame, which can translate generally forward and aft with optional tilting motion. The quadrant link and drive link attach together to form a pivot. The point of attachment between the two links is variable and customizable such that a hole combination is chosen to achieved a predetermined ratio of backrest recline to seat pan travel. In some embodiments, the quadrant link and drive link may both have multiple holes by which they can be linked together, permitting the relationship between backrest movement and seat pan articulation to be varied by changing the hole combination used. In other embodiments, one of the two links may have a single hole while the other of the two links may have multiple holes. Upon installation, or when the articulation relationship is to be changed, the drivet link is attached to the quadrant link, for example, by use of a fastener such as a link pin, at a hole combination that achieves the desired seat pan articulation.

Figure 1:
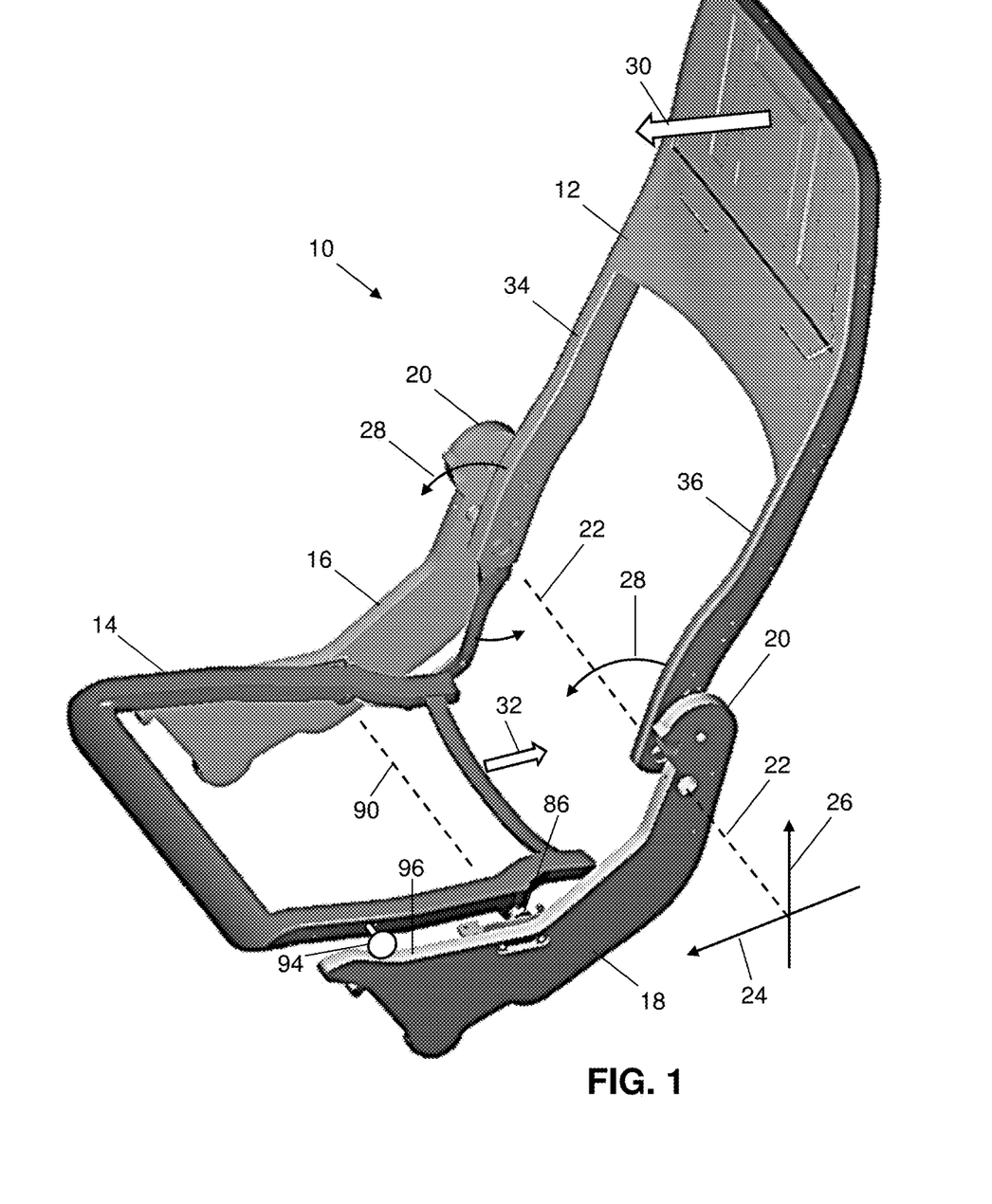
FIG. 1 is a perspective view of a reclining seat assembly according to the present disclosure.

A seat assembly 10 shown in FIG. 1 includes a backrest 12 and a seat pan frame 14 mounted between a pair of frame elements referenced as a right-side spreader 16 and a left-side spreader 18 with respect to the perspective of a seated passenger. The seat assembly 10 is shown without the coverings and attachments typically provided for passenger comfort in use. For example, an in-use seat assembly would likely include cushions attached to the backrest 12, and a cushioned seat pan attached to the seat pan frame 14. Respective pivoting armrests would likely be mounted to the upper ends 20 of the spreaders. These and other components of a passenger seat or seating row, such as a tray at the rear of the backrest, are not illustrated to permit view of the inventive features and benefits.

Each spreader in use would likely be supported by legs or beams connected directly or indirectly to the floor or other fixed structure of a passenger vehicle such as an aircraft. The spreaders together serve as a frame of reference treated as fixed or stationary in these descriptions. The backrest 12 is pivotally adjustable relative to the spreaders about a generally horizontal, fixed, laterally-extending pivot axis 22. For descriptive purposes, a generally horizontal forward direction 24, partially along which the seat pan frame 14 extends, is defined according to the expected perspective of a seated passenger. A vertical upward direction 26, partially along which the backrest 12 extends, is defined according to the general disposition of the back of a seated-upright passenger.

As the backrest 12 pivots in a first rotational direction 28 about the pivot axis 22, forward movement 30 in an upper portion of the backrest occurs at once with rearward movement 32 of the seat pan frame 14, and vice versa, rearward movement in an upper portion of the backrest occurs at once with forward movement of the seat pan frame. This corresponds, for example, to a passenger adjusting the seat assembly 10 from a reclined resting position to a more upright position, and vice versa, to a passenger adjusting the seat assembly from upright to reclined. Although forward movement 30 of the backrest 12 and corresponding rearward movement 32 of the seat pan frame 14 are expressly referenced for clarity in the drawings, it is understood that the backrest can be pivoted about the pivot axis 22 in reverse to the first rotational direction 28, with the backrest returning rearward and the seat pan frame 14 traveling forward. The backrest 12 includes a pair of beams, referenced as a right-side beam 34 and a left-side beam 36 pivotally connected to the right-side spreader 16 and a left-side spreader 18, respectively.

Figure 2:
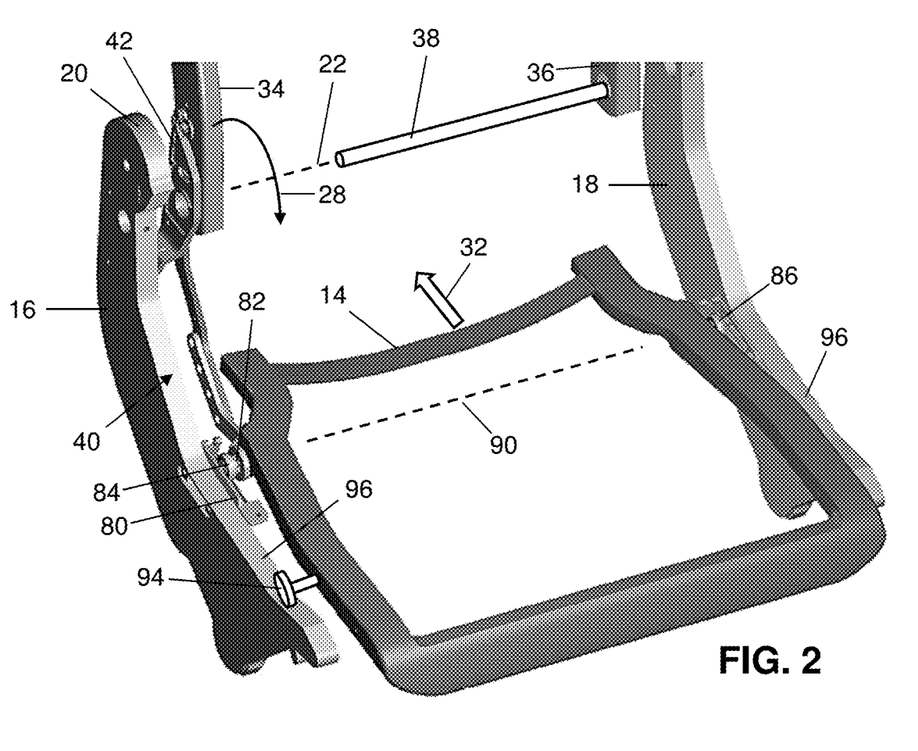
FIG. 2 is another perspective view of lower portions of the reclining seat assembly of FIG. 1.

FIG. 2 shows a right-side articulation mechanism 40, by which a lower end of the right-side beam 34 of the backrest is coupled to the seat pan frame 14. To continue the example of FIG. 1, rearward movement 32 of the seat pan frame 14 occurs as the backrest 12 pivots in the first rotational direction 28 about the pivot axis 22. A right-side articulation mechanism 40 at the right-side spreader 16 is expressly shown in the drawings and is described in the following. A symmetrically similar left-side articulation mechanism at the left-side spreader 18 is understood in a fully assembled and in-use seat assembly. For brevity, the following describes some features without necessarily referring to each as a right-side feature. It is understood such descriptions relate as well to a left-side articulation mechanism by implication.

Figure 3:
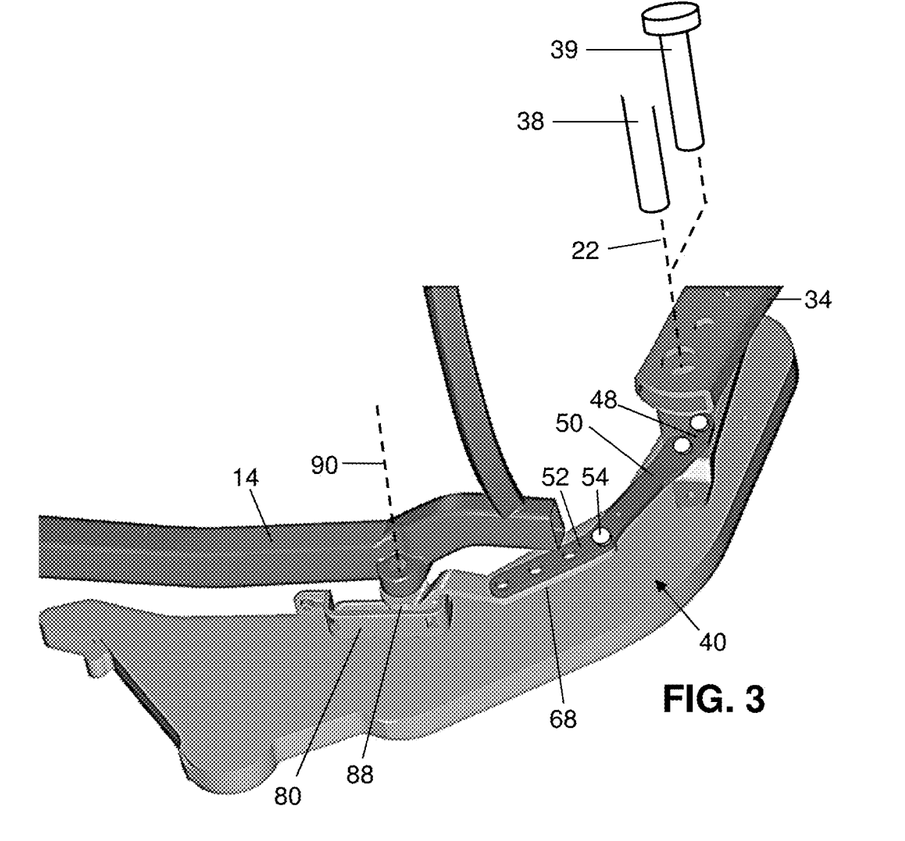
FIG. 3 is an enlarged perspective view, taken from underneath the seat assembly of FIG. 1, showing an articulation mechanism according to the present disclosure.

As shown in FIGS. 2-3, the lower end of the beam 34 is pivotally connected to the spreader by a connector 38. The connector is represented in FIGS. 2-3 as an axle laterally extending along the pivot axis 22 from the left-side spreader 18 and beam 36 to the right-side beam 34 and spreader 16, such that two lateral sides of the seat assembly 10 use a common pivot axis connector 38. Alternatively, the connector may be a single side connector 39, at each side of the seat assembly, represented as a pin in FIG. 3. Other pivoting connectors are within the scope of these descriptions.

A bracket 42 (FIG. 4) is fixedly attached to the lower end of the beam 34 as shown in FIG. 3, and thus moves with the backrest as the backrest pivots about the pivot axis. A lower end 44 of the bracket 42 extends lower than the pivot axis 22, and beyond the pivot axis 22 relative to the beam. As the beam 34 and backrest 12 pivot in the first rotational direction 28, portions of the beam and backrest that are above the pivot axis 22 translate with some forward movement 30. Simultaneously, the lower end 44 of the bracket 42 and other attached features that are below the pivot axis 22 translate with rearward movement.

The articulation mechanism 40 further includes a rigid quadrant link 46 (FIG. 4) having a first end section 48 fixedly attached to the lower end 44 of the bracket 42. The quadrant link 46 has a linear middle section 50 extending from the first end section 48 to a linear second end section 52. The middle section 50 and second end section 52 are connected together at a bend junction 47. Multiple holes are spaced along the second end section 52 of the quadrant link 46 with increasing distance from the first end section 48 and pivot axis 22, which is shown as a crosshair representing the center of rotation of pivoting movements referenced in FIG. 4. The holes are referenced in FIG. 4, proceeding along the second end section 52 from the middle section 50 with increasing distance from the pivot axis 22, as a first hole 61, second hole 62, third hole 63, and fourth hole 64. Any number of thru-holes, spacing between holes, and predetermined distances from the backrest pivot axis are possible.

Figure 4:
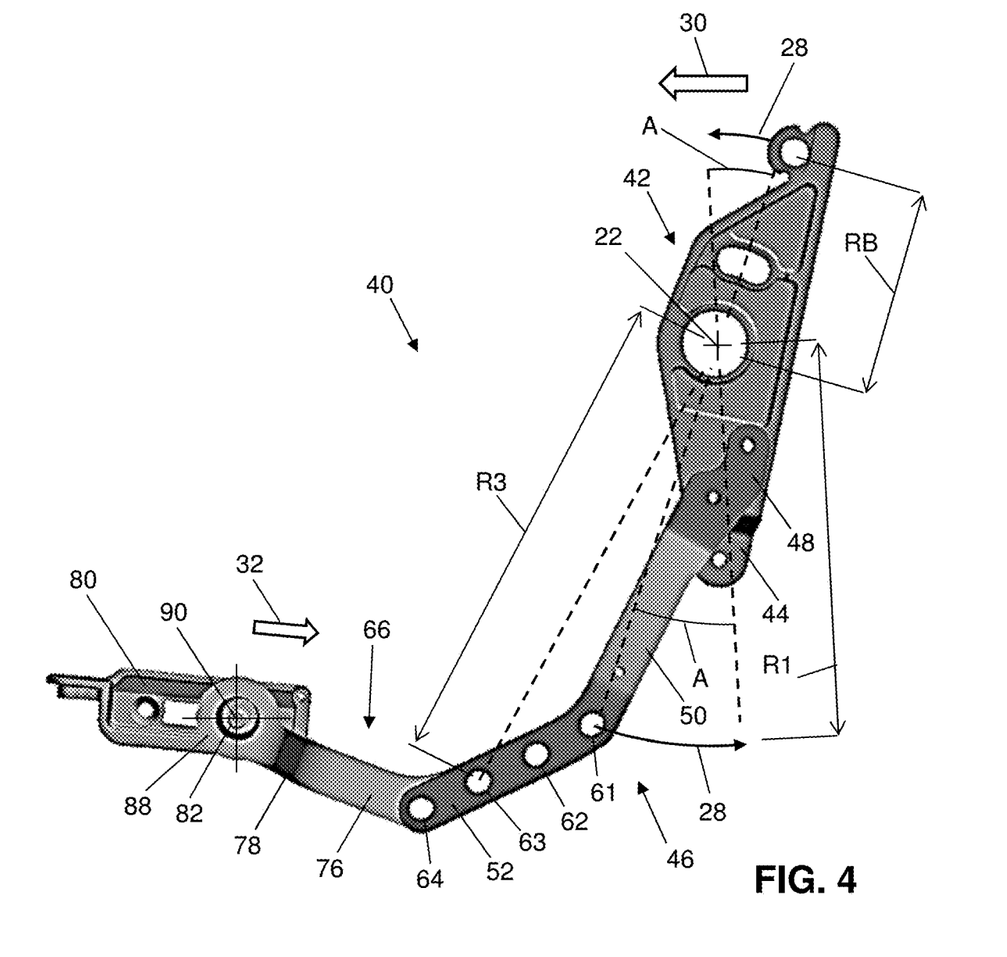
FIG. 4 is a side view of the articulation mechanism of FIG. 3, showing the quadrant link, drive link, bracket, and track without other components of the seat assembly.
Figure 5:
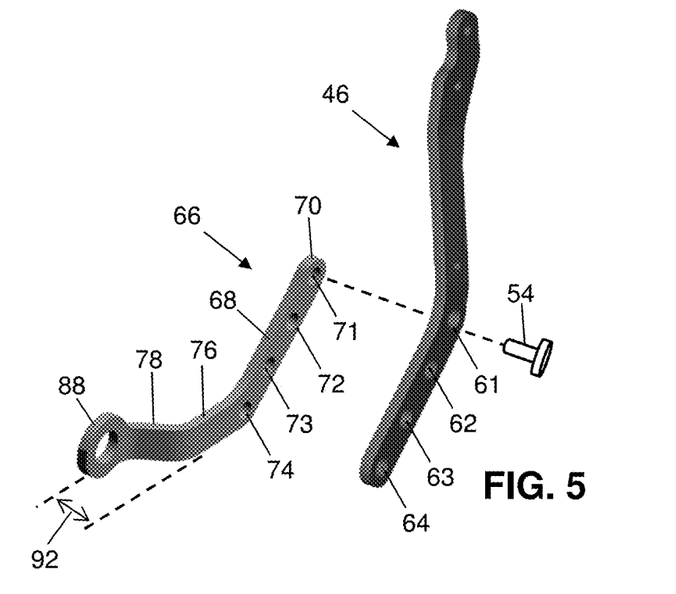
FIG. 5 is a perspective view of the quadrant link and drive link aligned for a first articulation relationship between seatback adjustment and seat pan frame articulation.

The articulation mechanism 40 further includes a rigid drive link 66 having a linear first end section 68 (FIG. 6) pivotally attachable to the second end section 52 of the quadrant link 46 at a selected one of the multiple holes by a fastener that permits pivoting movement of the drive link 66 relative to the quadrant link 46. For example, a fastener is shown as a link pin 54 in FIGS. 5 and 6 for pivotally attaching the drive link 66 to the quadrant link 46. Multiple holes, which are referenced as a first hole 71, second hole 72, third hole 73, and fourth hole 74 in FIG. 5, are spaced along the first end section 68 of the drive link with increasing distance from the terminus 70 of the of first end section. Any selected hole in the first end section 68 of the drive link 66 can be aligned with any selected hole in second end section 52 of the quadrant link 46 to pivotally connect the drive link 66 to the quadrant link 46 and thereby couple to the seat pan frame to the backrest for coupled movement. In FIG. 3, the drive link 66 is pivotally attached to the quadrant link 46 by the link pin 54 at the aligned first hole 61 of the quadrant link 46 and first hole 71 of the drive link 66 (FIG. 4).

The drive link 66 has a linear middle section 76 extending from the first end section 68 to a second end section 78, which is pivotally coupled to the seat pan frame 14. The first end section 68 and middle section 76, which are connected together at a bend junction 67, share a plane 79 (FIG. 5). The second end section 78 extends laterally outward from the plane of the first end section 68 and middle section 76, providing a lateral offset 92 (FIG. 5).

The seat pan frame 14 is supported at each lateral side by a respective track 80 fixedly attached to the inward lateral side of each spreader. As shown in particular for the right-side spreader 16 in FIGS. 2 and 4, an axle 82 connected to the laterally outer side of the seat pan frame 14 extends toward the track 80. A roller 84 rotationally mounted on the axle 82 engages the track 80 and is rollable along the track. The right-side axle 82 and roller 84 are aligned with the left-side roller 86 (FIG. 2) and corresponding axle along a laterally extending travel axis 90, which moves accordingly with the seat pan frame 14. Thus, the seat pan frame 14 is movably attached to each spreader for both pivoting rotational movement about the corresponding axle and translational movement along the corresponding track. The track 80 extends generally horizontally thereby facilitating forward and rearward movement 32 of the seat pan frame 14. The track 80 may be inclined forward as shown in FIG. 5 such that rearward movement 32 of the roller 84 along the track lowers the rear of the seat pan frame 14 according to the angle of inclination.

The second end section 78 of the drive link 66 is shown as having a ring 88 with a central hole for pivotally coupling the drive link to the seat pan frame 14 by way of the axle 82. The ring 88 lies in a plane that is parallel to the shared plane 79 of the first end section 68 and middle section 76. The ring 88 is spaced laterally outward relative to the first end section 68 and middle section 76 by the lateral offset 92 (FIG. 5) provided by the second end section 78 (FIG. 5) to reach the axle 82, which extends from the seat pan frame 14 and through the ring 88. As the quadrant link 46 pivots about the pivot axis 22 with forward adjusting movement of the backrest 12, the drive link 66 is pulled rearward by the quadrant link 46, and thus pulls the seat pan frame 14 rearward as the roller 84 travels along the track 80. Conversely, when the quadrant link 46 pivots about the pivot axis 22 with rearward adjusting movement of the backrest 12, the drive link 66 is pushed forward by the quadrant link 46, and thus pushes the seat pan frame 14 forward.

The quadrant link 46 is fixedly attached to the bracket 42 and is thus fixed relative to the beam 34 of the backrest. The quadrant link 46 thus moves by simply pivoting around the pivot axis 22 as represented in FIG. 4. The pivot link 66 is pivotally connected to each of the quadrant link 46 and the axle 82 on which the seat pan frame 14 travels. Thus, the pivot link 66 both translates and rotates as the articulation mechanism 40 functions.

The selection of the holes by which the drive link 66 is pivotally attached to the quadrant link 46 sets the relationship between backrest movement and seat pan articulation. This can be understood for example in view of FIG. 4. As the backrest pivots an angle A in a first rotational direction 28 about the pivot axis 22, generally forward movement 30 occurs in all portions of the bracket 42 and backrest that are above the pivot axis 22. The amount of movement or distance of arcuate travel of any point along the bracket 42 and backrest 12 is proportional to the angle A and a radius by which the point is spaced from the pivot axis 22. For example, the upper end of the bracket 42 referenced in FIG. 4 at a radius RB travels approximately forward along an arc of travel proportional to the radius RB and the angle A (arc length=radius×angle). This is perceived by a seated passenger as forward movement 30 (FIG. 1) in an upper portion of the backrest 12 by pivoting movement of the backrest around the pivot axis 22 by the angle A (FIG. 4).

As the backrest 12 pivots about the pivot axis 22 by the angle A, generally rearward movement 32 occurs in all points along the bracket 42 and quadrant link 46 that are below the pivot axis 22. Each such point travels along an arc proportional to its radius from the pivot axis 22 and the angle A. For example, the hole in the second end section 52 nearest the pivot axis 22 and referenced as the first hole 61 is distanced from the pivot axis 22 by a radius R1 and accordingly travels approximately rearward along an arc of travel proportional to the radius R1 and the angle A. Another hole in the second end section 52 further from the pivot axis 22 and referenced as the third hole 63 is distanced from the pivot axis 22 by a radius R3 that is greater than R1, and accordingly travels approximately rearward along an arc of travel proportional to the radius R3 and the angle A. The first hole 61 and third hole 63 travel by different amounts as the backrest pivots by any given angle as represented by the bracket 42 in FIG. 4. Thus, each particular one of the multiple holes in the second end section 52 of the quadrant link 46 corresponds to a particular predetermined ratio of backrest recline to seat pan travel.

Figure 6:
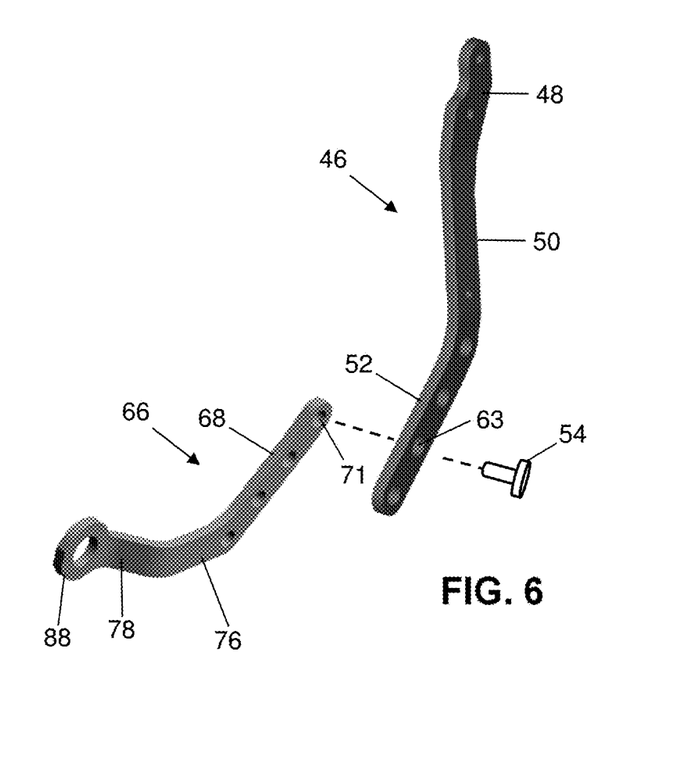
FIG. 6 is a perspective view of the quadrant link and drive link aligned for a second articulation relationship between seatback adjustment and seat pan frame articulation.

The quadrant link 46 and drive link 66 are depicted in exploded perspective views in FIGS. 5-6 to show that the holes by which the drive link is pivotally attached to the quadrant link can be selected to set the relationship between backrest movement and seat pan articulation. In FIG. 5, the first hole 61 of the quadrant link 46 is aligned with the first hole 71 of the drive link, for pivotal attachment by the link pin 54. In FIG. 6, the third hole 63 of the quadrant link 46 is aligned with the first hole 71 of the drive link, for pivotal attachment by the link pin 54. To pivotally attach the drive link 66 to the quadrant link 47, the link pin 54 is received by the selected aligned holes and engages the drive link and quadrant link.

Thus, the linking arrangements of FIGS. 5 and 6 provide different correspondence of the translational movement of the backrest 12 relative to the translational movement of the seat pan frame 14 according to the different radii R1 and R3 of the first hole 61 and second hole 71 of the quadrant link 46 relative to the pivot axis 22 (FIG. 4). As any selected hole in first end section 68 of the drive link 66 can be aligned with any selected hole in second end section 52 of the quadrant link 46 to pivotally connect the drive link to the quadrant link 46, the articulation mechanism 40 provides variability to articulating seats.

Due to alignment of the right-side axle 82 and roller 84 (FIG. 2) with the left-side roller 86 (FIG. 4) and corresponding axle, the angle of the seat pan frame 14 optionally adjusts by controlled rotation about the travel axis 90, for example as the seat pan frame 14 moves forward or rearward. The angle of the seat pan frame 14 depends on what structure forward of the travel axis 90 supports forward portions of the seat pan frame 14. In the illustrated embodiment, the seat pan frame 14 is further supported at each lateral side forward of the travel axis 90 by respective top edges of the spreaders. At each lateral side, a guide wheel 94 extends from the seat pan frame 14 and rolls upon the guide edge 96 of the corresponding spreader. The guide wheels 94 track along the guide edges 96 of the spreaders, so the shapes of the spreaders determine the seat pan angle.

Figure 7:
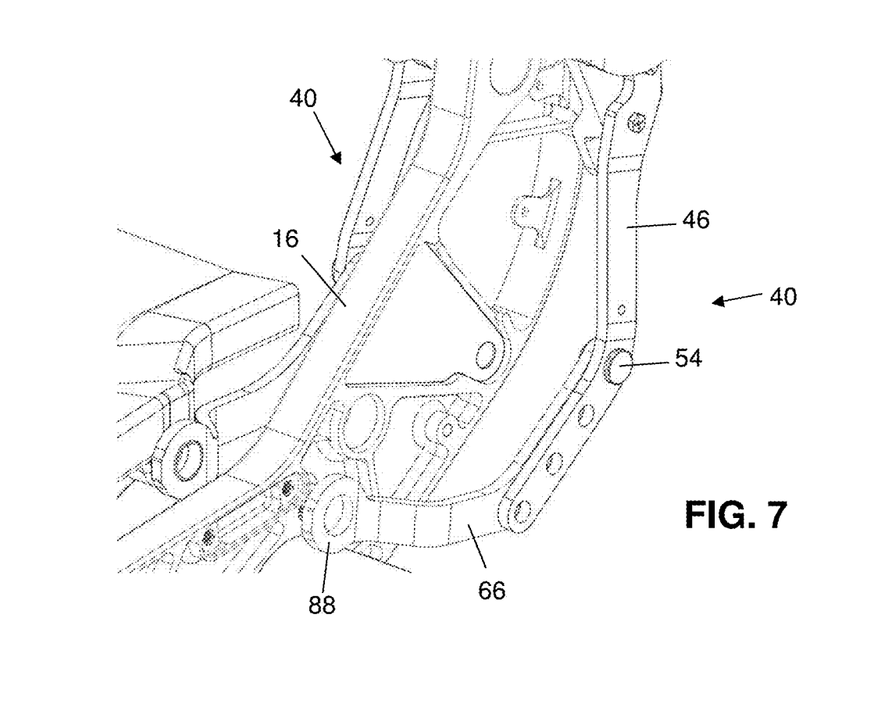
FIG. 7 is a perspective view of the articulation mechanism of FIG. 3 installed on a seat assembly with a skeletonized spreader.
Figure 8:
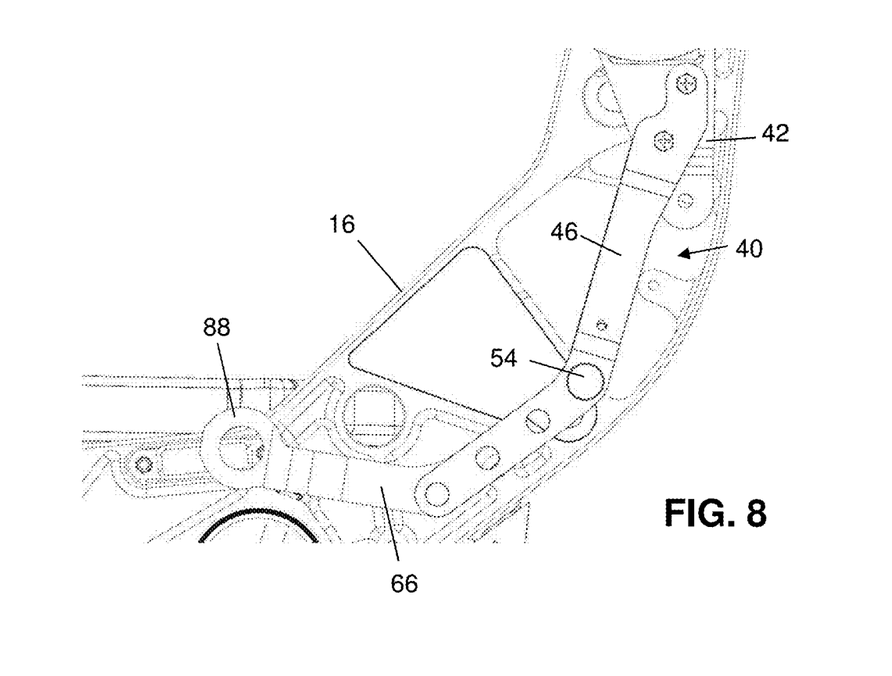
FIG. 8 is a side view of the articulation mechanism and seat assembly of FIG. 7.

FIGS. 7 and 8 show the right-side spreader 16 as skeletonized as may be preferred in use in an aircraft to minimize weight. The spreader 16 is shown in FIG. 7 as having a respective articulation mechanism 40 mounted on each side, representing the spreader 16 as a shared structural support for adjacent seats in a seating row.

The drawings generally reference movements of the articulation mechanism 40 correlated with the backrest 12 pivoting in the first rotational direction 28 as referenced in FIG. 1, in which forward movement 30 in an upper portion of the backrest 12 occurs at once with rearward movement 32 of the seat pan frame 14. It is understood that the referenced movements of the articulation mechanism 40 will reverse when the backrest 12 returns rearward and the seat pan frame 14 travels forward.

An articulation mechanism according to the descriptions above permit the relationship between backrest adjustment and seat pan articulation to be varied conveniently with a set of universal or widely applicable parts. The articulation of a seat assembly can be varied according to how the seat is to be used, for example according to the available space and corresponding recline limits dictated for various seating section in an aircraft. Different configurations of the articulation mechanism can be set for different areas of a passenger cabin, permitting one seating assembly model to suit various uses. The articulation relationship provided by the articulation mechanism can be various by repositioning the link pin relative to either or both hole sets of the quadrant link and drive link.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An articulation mechanism for coupling a pivoting backrest to a traveling seat pan frame, the mechanism comprising:
   a first link having a first end section attachable to a pivoting backrest, and a second end section connected to the first end section, the second end section having multiple holes;
   a second link having a first end section and a second end section connected together, the first end section of the second link having multiple holes, wherein one of the multiple holes of the first end section of the second link is alignable with one of the multiple holes of the second end section of the first link, the second end section of the second link pivotally attachable to a seat pan frame; and a fastener pivotally attaching the second link to the first link via the one of the multiple holes of the first end section of the second link and the aligned one of the multiple holes of the second end section of the first link.

2. The articulation mechanism of claim 1, wherein the multiple holes of the second end section of the first link are spaced with increasing distance from the first end section of the first link.

3. The articulation mechanism of claim 2, wherein, when the first end section of the first link is attached to a pivoting backrest, and the second end section of the second link is pivotally attached to a seat pan frame, each of the multiple holes of the first and second links, when the first and second links are pivotally attached, corresponds to a predetermined ratio of backrest recline to seat pan travel.

4. The articulation mechanism of claim 2, wherein the second end section of the first link is linear.

5. The articulation mechanism of claim 4, wherein the first link comprises a linear middle section by which the second end section of the first link is connected to the first end section of the first link; and wherein the second end section of the first link is connected to the middle section of the first link by a bend junction.

6. The articulation mechanism of claim 1, wherein the multiple holes in the first end section of the second link are spaced with increasing distance from a terminus of the first end section of the second link.

7. The articulation mechanism of claim 1, wherein the first end section of the second link is linear.

8. The articulation mechanism of claim 7, wherein the second link comprises a linear middle section by which the second end section of the second link is connected to the first end section of the second link; and wherein the second end section of the second link is connected to the middle section of the second link by a bend junction.

9. The articulation mechanism of claim 8, wherein the second end section of the second link has a ring surrounding a hole for pivotally attaching the second link to a seat pan frame.

10. The articulation mechanism of claim 1, wherein the second end section of the second link has a ring surrounding a hole for pivotally attaching the second link to a seat pan frame, the ring lying in a plane that is parallel to and offset from a plane in which the first end second of the second link extends.

11. A passenger seat assembly, comprising:
at least one stationary frame element;
a backrest pivotally attached to the at least one stationary frame element;
a seat pan frame movable relative to the at least one stationary frame element; and an articulation mechanism coupling the seat pan frame to the backrest, the articulation mechanism comprising:
a first link having a first end section, a linear second end section, and a linear middle section connecting the first end section and the linear second end section, the first end section fixedly attached to the backrest, the linear second end section having multiple holes, and the linear second end section connected to the linear middle section by a bend junction; and
a second link pivotally attached to the seat pan frame and pivotally attachable to the first link by way of any one of the multiple holes,
wherein each of the multiple holes, when the first and second links are pivotally attached, corresponds to a predetermined ratio of backrest recline to seat pan travel.

12. The articulation mechanism of claim 11, wherein the second link has one or more holes for pivotally attaching the second link to the first link.

13. The articulation mechanism of claim 12, wherein the second link has a plurality of holes, the second link having a linear section along which the plurality of holes are spaced.

14. The articulation mechanism of claim 13, wherein the plurality of holes are spaced along the linear section of the second link with increasing distance from a terminus of the second link.

15. The articulation mechanism of claim 11, wherein the second link has a ring surrounding a hole for pivotally attaching the second link to a seat pan frame.

16. The articulation mechanism of claim 15, wherein the second link has a first end section by which the second link is pivotally attachable to the first link, and wherein the ring is disposed in a plane that is parallel to and offset from a plane in which the first end section of the second link extends.

17. An articulation mechanism for coupling a pivoting backrest to a traveling seat pan frame, the mechanism comprising:
a first link having a first end section configured to attach to a pivoting backrest, and a second end section connected to the first end section, the second end section having at least one hole; and
a second link having a first end section having multiple holes and a second end section configured to pivotally attach to a seat pan frame,
wherein the at least one hole of the first link can align with any one of the multiple holes of the second link to pivotally attach the second link to the first link, and
wherein each particular one of the multiple holes of the second link corresponds to a particular predetermined ratio of backrest recline to seat pan frame travel.

18. The articulation mechanism of claim 17, wherein the multiple holes of the second link are spaced with increasing distance from a terminus of the second link.

* * * * *